Jan. 3, 1928.　　　　　　　　　　　　　　1,654,767
J. VANNETTE
LAWN MOWER
Filed Jan. 22, 1924　　　　5 Sheets-Sheet 1

INVENTOR.
BY Joseph Vannette

ATTORNEY.

Jan. 3, 1928.　　　　　　　　　　　　　　　　　　　1,654,767
J. VANNETTE
LAWN MOWER
Filed Jan. 22, 1924　　　　　5 Sheets-Sheet 2

INVENTOR.

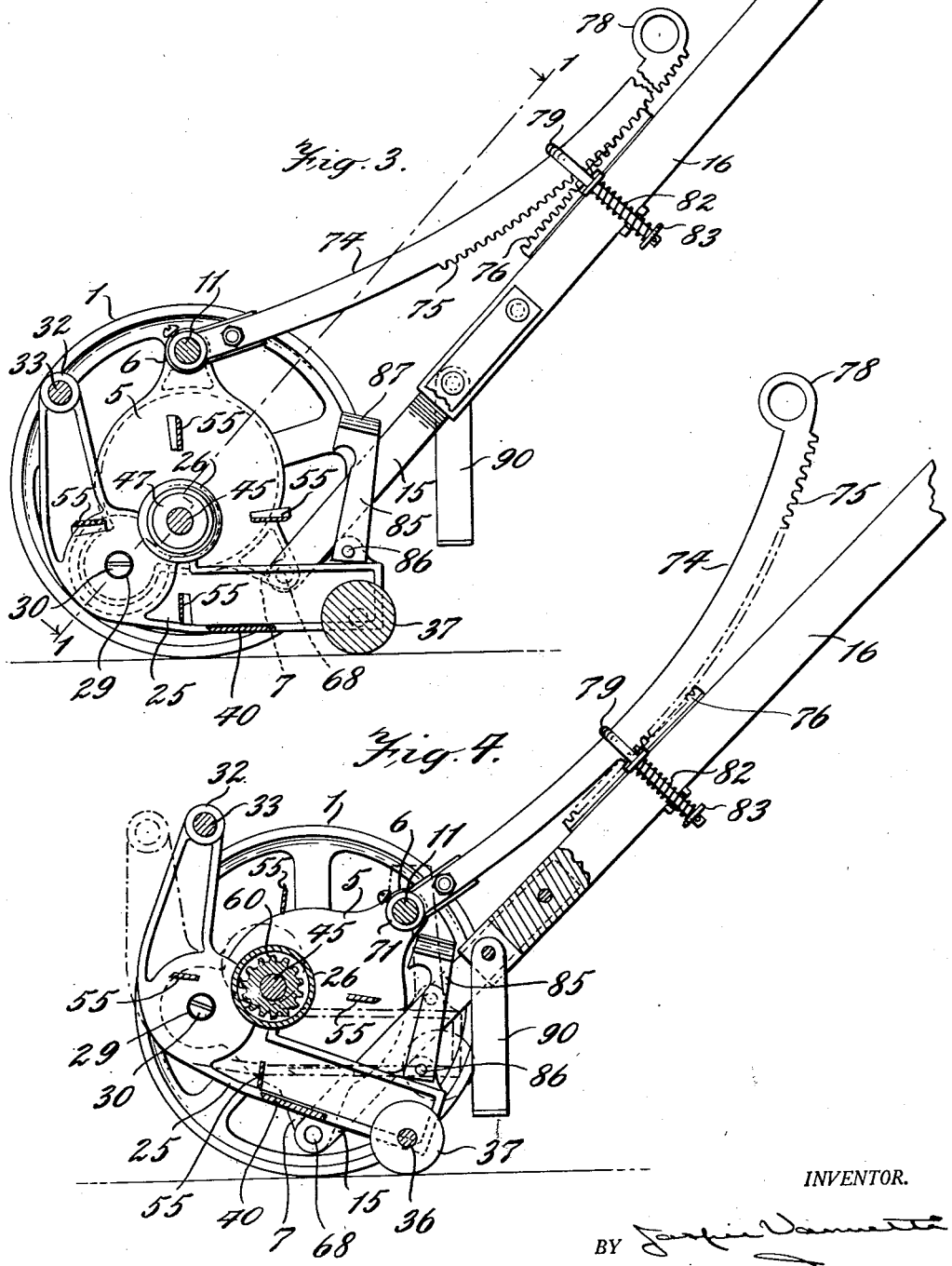

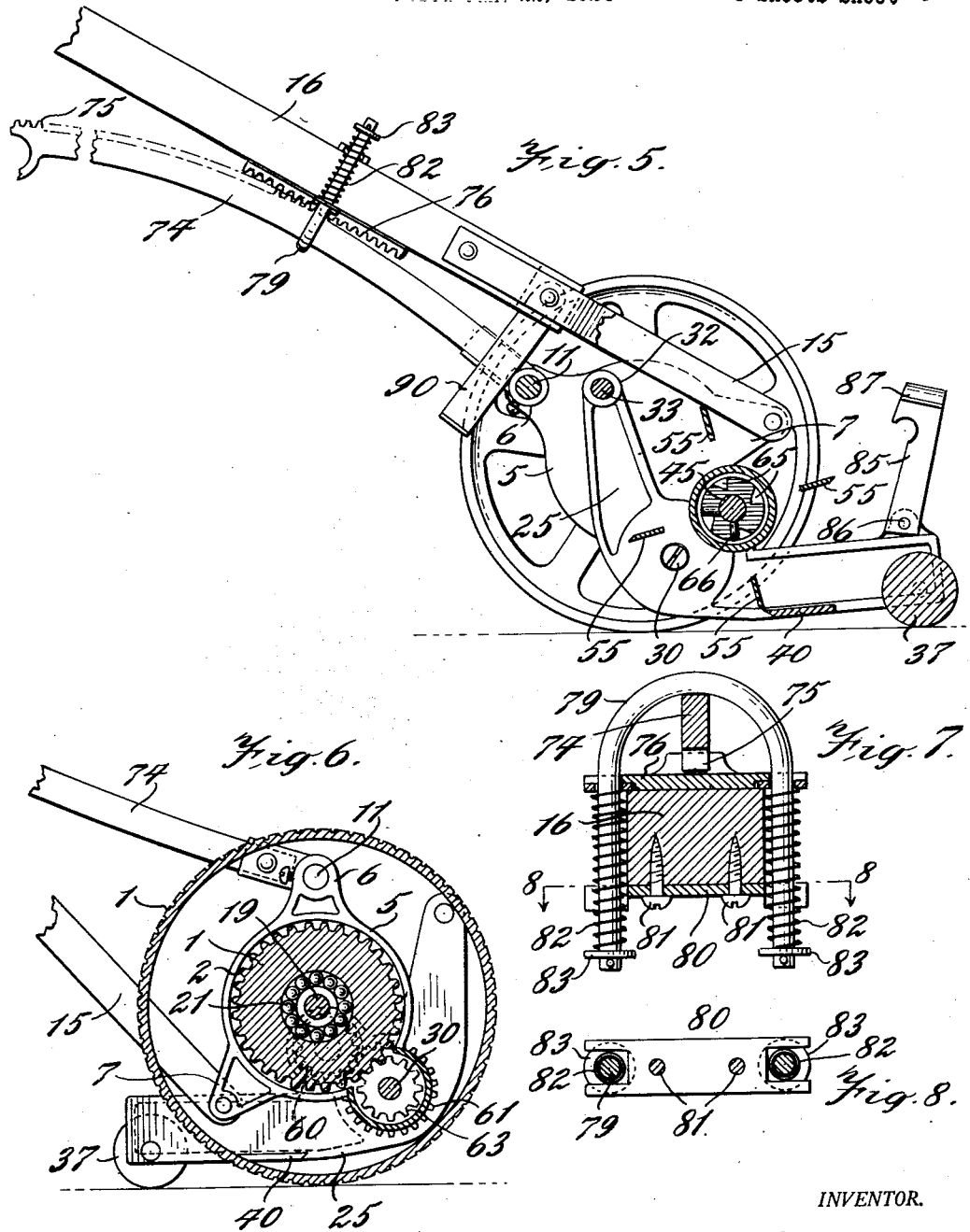

Jan. 3, 1928. 1,654,767
J. VANNETTE
LAWN MOWER
Filed Jan. 22, 1924 5 Sheets-Sheet 5
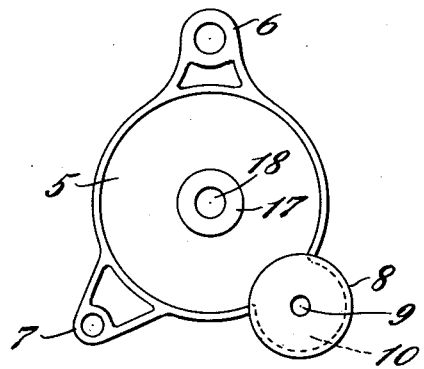
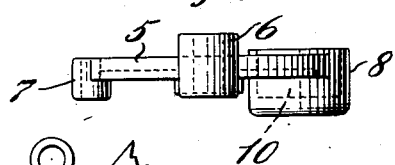
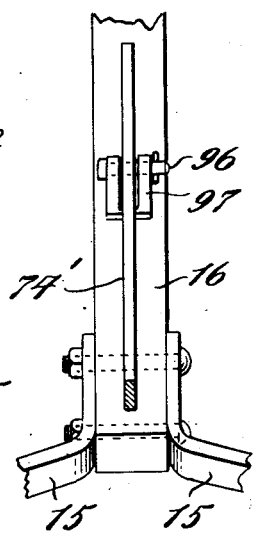
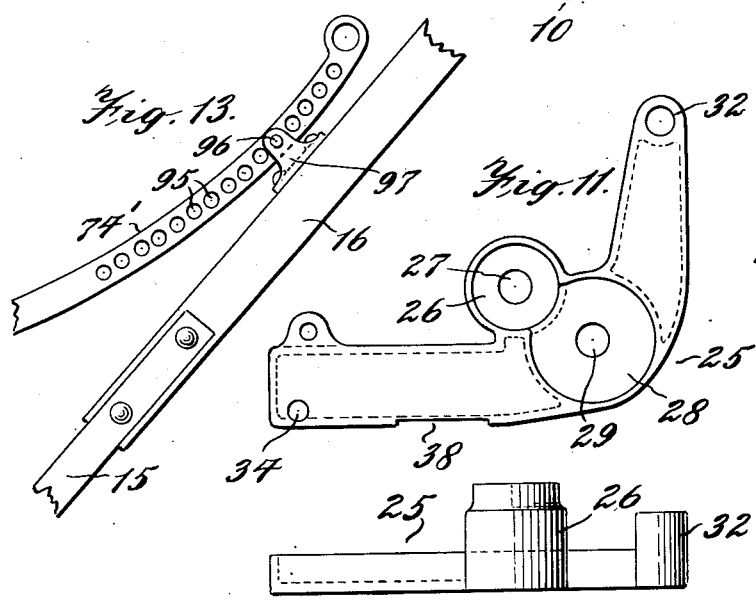
INVENTOR.
BY
ATTORNEY.

Patented Jan. 3, 1928.

1,654,767

UNITED STATES PATENT OFFICE

JASPER VANNETTE, OF TIFFIN, OHIO, ASSIGNOR OF ONE-THIRD TO VERNE V. VANNETTE AND ONE-THIRD TO ADAIR B. VANNETTE, BOTH OF TIFFIN, OHIO.

LAWN MOWER.

Application filed January 22, 1924. Serial No. 687,740.

This invention relates to lawn mowers of the type shown in Letters Patent No. 1,412,583, granted to me April 11, 1922, which comprise a main frame journaled in the ground wheels of the mower, and a secondary frame carrying the cutting mechanism which is pivoted eccentrically on the main frame; the handle of the mower being so fixed to the main frame that vertical movement of its outer end will effect a pivotal movement of said main frame and thereby shift the vertical position of the connected secondary frame and supported cutting mechanism. With this arrangement of parts, it was found that uniformity of cut over uneven ground was somewhat difficult of accomplishment because of the practical inability of the operator to readily shift the handle in a way to accurately compensate for the irregularities in the surfaces being cut over.

It has therefore been one of the objects of my present invention to provide machines of this character with means for readily and accurately adjusting the cutting mechanism relatively to the surface of the ground, without necessarily stopping the operation of the machine, so that the operator may regulate the elevation of the cutter reel and the ledger bar to leave a stand of grass of any desired and uniform height, irrespective of the contour of the ground, the adjustment being made by means of a handle pivotally connected to the main frame of the machine, and a bar extending longitudinally of the handle, pivotally connected at one end to the main frame and having a sliding locking connection with the handle at the other, so that by unlocking the bar from the handle and moving the bar longitudinally of the handle the main frame will be rotated about its journal bearings in the ground wheels and the pivotal connection between the secondary frame and the main frame will be correspondingly raised or lowered, thereby elevating or depressing the cutter reel and the ledger bar relatively to the surface of the ground.

Other objects and advantages of the invention will be referred to in the detailed description of the invention which follows.

The invention is illustrated in the accompanying drawings, in which:

Fig. 3 is a similar view of the machine adjusted for a coarser cut.

Fig. 4 is a similar view of the machine adjusted for a relatively high cut, the section being taken on the line 4—4 of Fig. 1.

Fig. 5 is a side elevation partly in section showing the machine with the handle reversed for effecting a rear or draw cut, the section being taken on the line 5—5 of Fig. 1.

Fig. 6 is a section on the line 6—6 of Fig. 1, looking in the direction indicated by the arrows.

Fig. 7 is a transverse section through the handle, the adjusting bar and the means for locking these parts together in adjusted position.

Fig. 8 is a section on the line 8—8 of Fig. 7.

Fig. 9 is a side elevation of one of the main frame side members.

Fig. 10 is a plan view of the same.

Fig. 11 is a side elevation of one of the secondary frame members.

Fig. 12 is a plan view thereof.

Fig. 13 is a fragmentary side elevation of a modification of the locking means between the handle and pull rod.

Fig. 14 is a plan view of the same.

Figure 1:
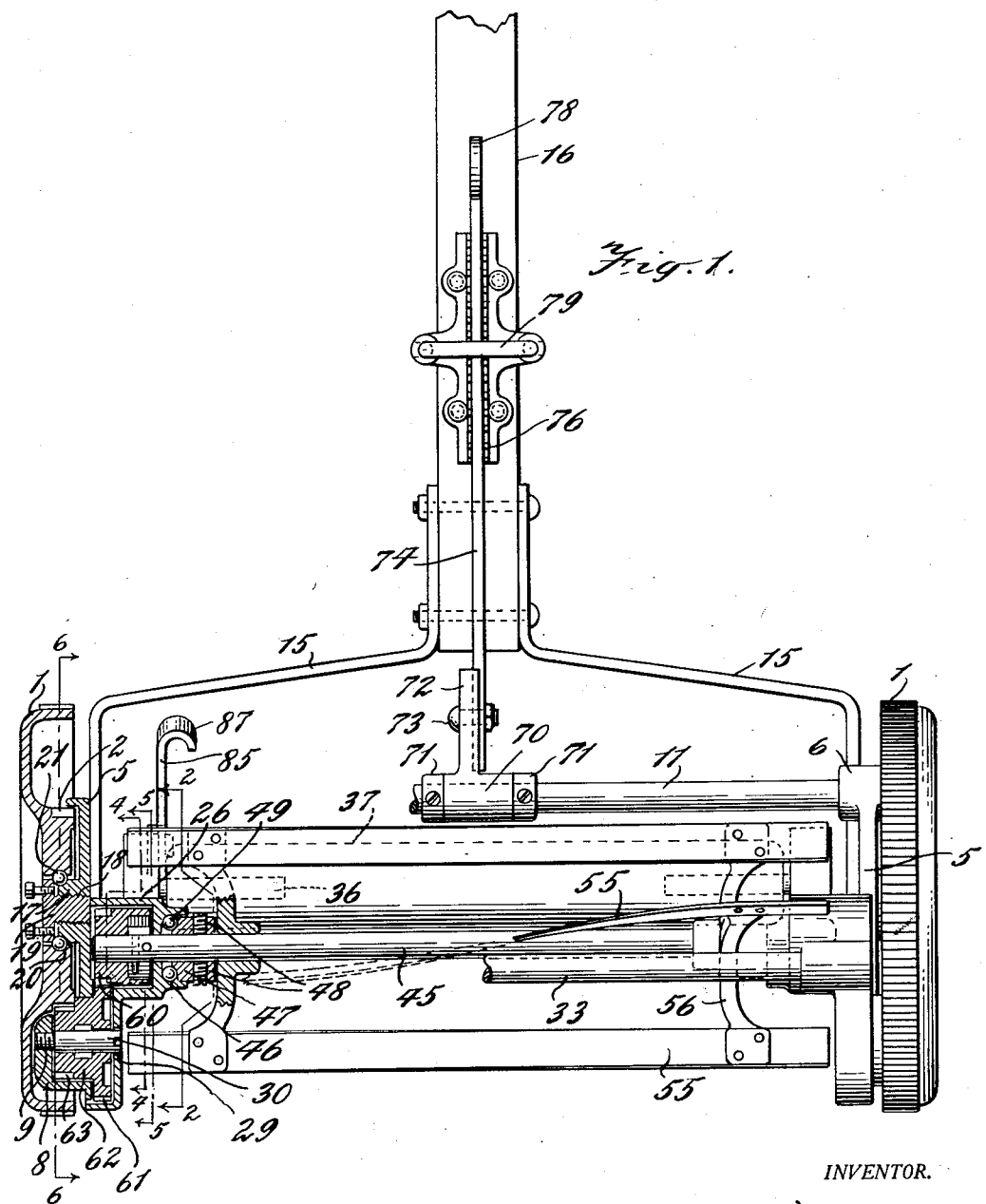
Fig. 1 is a plan view with certain parts shown in section on the line 1—1 of Fig. 3 and certain other parts broken away.

Referring to the drawings, 1, 1 indicate two ground wheels each provided with a central hub portion having peripheral gear teeth 2 which constitute the driving means for the cutter mechanism.

The main frame of the machine includes two side plates 5, 5, shown in detail in Figs. 9 and 10, each provided with two oppositely spaced perforated lugs 6 and 7, and a laterally offset bracket or boss 8 provided with a central screw-threaded opening 9 in axial alignment with an enlarged circular recess 10 which constitutes the supporting housing for an intermediate transmission gear to be hereinafter referred to which is interposed between the ground wheels and the cutter reel. The lugs 6, 6 of the respective plates are connected by a tie rod 11, and the perforated lugs 7 serve as an attaching means for the bail members 15—15 of a handle 16, by means of which the machine is either pushed or drawn by the operator. Each side frame member 5 is provided with a central boss 17 having a screw threaded central opening 18 to receive a set-screw 19, which latter is provided with one-half of a stationary raceway, the other half of which is formed on the outer peripheral edge of the boss 17. The cooperating raceway section is formed on the interior surface of the hub, as indicated at 20, and confines a series of anti-friction balls 21 upon which the ground wheels revolve.

The secondary frame includes two side members 25, 25, preferably formed as generally L-shaped castings, each having a flange extending around its edges and provided with a hollow boss or gear housing 26 having a central perforation 27, which housing opens into a second gear housing or recess 28 provided with a central opening 29, which latter constitutes the fulcrum or pivot point of a corresponding frame member, the said opening 29 being engaged by a stud 30 which is tapped into the opening 9 in the hollow boss or housing 8 of the adjacent main frame member 5 (Fig. 1). The upwardly projecting arm of each side frame member 25 terminates in a perforated end 32, the said ends being connected by a tie rod 33 engaging the openings therein. Near the end of the substantially horizontal member of each secondary frame member 25, there is provided an opening 34 to receive the end bearing studs or pintles 36 of a ground roller 37, and each of the frame members 25 is also provided on the lower edge of its horizontal member with a recessed seat 38 in which is secured the ends of a stationary knife or ledger bar 40 with which the knives of the cutter reel cooperate.

The shaft 45 of the cutter reel extends through the central openings 27 in the bosses 26 in the side members of the secondary frame and its respective ends are supported in anti-friction bearings, each constituted by a half raceway 46 formed in the interior of the boss 26 and a second half raceway formed on the adjacent face of a collar or sleeve 47 secured to the shaft 45 by means of screw studs 48, the mating raceway sections confining an annular series of anti-friction balls 49.

The cutter knives 55, which are of the usual type, are supported on spiders 56 secured to the shaft 45. On each end of the cutter reel shaft 45 is mounted a gear 60 which is adapted to mesh with the toothed section 61 of a duplex gear 62 journaled on the stud 30 carried by the corresponding side member of the main frame, as hereinbefore explained, which stud also constitutes the fulcrum support for the adjacent member 25 of the secondary frame. The duplex gear 62 is provided with a second set of teeth 63 which mesh with the teeth 2 on the corresponding ground wheel.

Each of the gears 60 is enclosed within the boss or housing 26 of the corresponding secondary frame member 25, and the inner face of each of said gears (Figs. 1 and 5) is provided with a circular recess on the inner wall of which are formed angular projections 65 each having one radial face and one inclined face adapted to cooperate with cross pins 66 slidably mounted in openings in the cutter reel shaft 45, the projections 65 and cross pins 66 constituting a pawl and ratchet device which effects the rotation of the cutter reel when the mower is shoved forward and permitting the cutter reel to remain idle when the mower is pulled backward.

Figure 2:
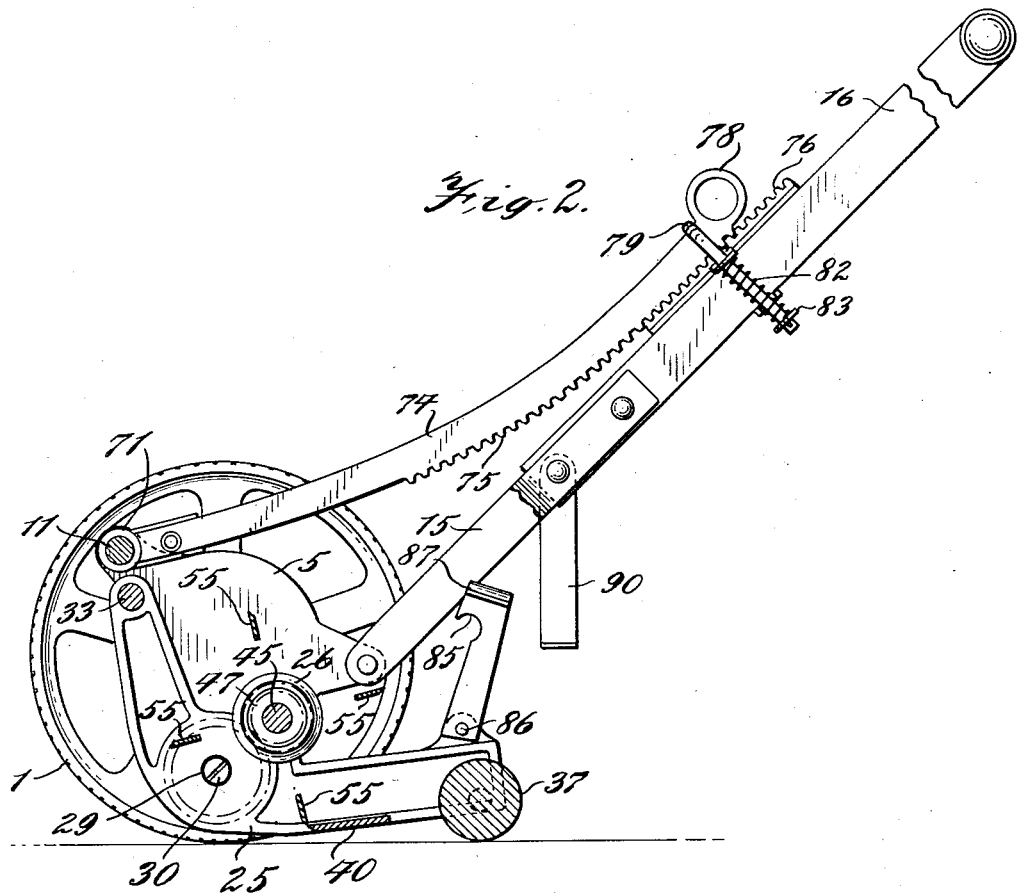
Fig. 2 is a side elevation partly in section showing an adjustment of the cutter mechanism for a close cut, the section being taken on the line 2—2 of Fig. 1.

As thus far described, the machine does not differ in material particulars from that illustrated and described in the prior patent aforesaid, but, in the patented construction, in order to effect the cutting of the grass at predetermined heights from the ground, it was necessary to raise and lower the handle of the machine while the latter was being operated, which had the effect of correspondingly lowering or raising the forward end of the secondary frame and with it the cutter reel and the ledger bar. With the old arrangement, as hereinbefore mentioned, uniformity of cut was difficult of accomplishment, particularly when the surface of the ground was uneven or of a rolling character, because of the practical inability of the operator to shift the handle up and down to accurately compensate for the irregularities in the surface being cut over. The present invention provides means for effecting an instantaneous, positive and accurate adjustment of the cutting mechanism with respect to the ground, so that any desired depth of cut may be made at any time during the operation of the machine, or the cutting mechanism may be adjusted and locked in such adjusted position to insure a uniform cut, which will not be affected by any accidental raising or lowering of the handle of the machine by the operator. To effect this operation, the handle 16 is pivotally connected to each of the side members 5 of the main frame by means of pins 68 in the ends of the bail arms 15 engaging the lugs 7 substantially opposite the lugs 6, by means of which latter the members 5 are cross connected by the tie rod 11. Loosely mounted on the tie rod 11 is a sleeve 70 which is secured against longitudinal movement on the rod by means of collars 71. Extending from the sleeve 70 is a bracket arm 72 to which is fastened, by a bolt 73, one end of a pull rod or bar 74, which extends longitudinally of and in general axial alignment with the handle 16, the under curved surface of the bar 74 being provided with a series of teeth 75 adapted to be adjustably interlocked with corresponding teeth on a rack 76 secured to the upper face of the handle 16. The free end of the bar 74 is provided with a finger piece 78 by means of which the bar may be lifted to disengage the teeth of the locking mechanism and also to permit the bar to be moved longitudinally of the handle. In order to lock the bar 74 in any predetermined adjustment with respect to the handle, there is secured to the handle a yoke-like member 79 which straddles the handle 16 and the bar 74 and which is guided in its vertical movements by means of perforated lugs on the side of the rack 76 and similar perforated lugs on a plate 80 secured by screws 81 to the lower face of the handle. Each leg of the yoke is surrounded by a helical spring 82 confined between the under face of the rack plate 76 and a washer 83 pinned to the lower end of the leg, the springs serving to pull the curved portion of the yoke toward the top of the handle, thereby forcing the teeth 75 on the pull rod 74 into engagement with the teeth on the rack 76. It will be particularly noted that the specific adjustment of the pull rod 74 with respect to the handle will determine the relative adjustment of the main and secondary or auxiliary frames of the machine and therefore the relation of the cutting mechanism to the ground to regulate the height of the grass or stubble. The main frame comprising the side members 5 and the connecting tie rod 11, is revolvable about the axis of rotation of the ground wheels and inasmuch as the secondary frame is fulcrumed or pivoted to the main frame on an axis eccentric to the axis of rotation of the main frame, any rotatory movement imparted to the main frame will raise or lower the secondary frame and with the latter the cutting mechanism, without, however, elevating the ground roller 37 or causing the latter to disengage the surface of the ground. For example, as illustrated in Fig. 2, the pull rod 74 is shown in its lowest adjustment with respect to the handle 16 and the end of the rod connected with the main frame by the tie rod 11 has rotated the main frame in a forward direction, viz., in the direction of movement of the mower, which carries the fulcrum point of the secondary frame to its lowest position, so that the ledger bar 40 is close to the ground and the cutter reel knives effect a short or close cut of the grass. When it is desired to make a coarser cut with a high stand of grass or stubble, the pull rod 74 is released from its locking engagement with the handle by the operator grasping the finger piece 78 and lifting the end of the rod against the tension of the springs 82 on the clamping yoke and pulling the rod 74 backward along the handle until the desired adjustment is effected, after which the bar 74 is released and is immediately snapped into locking position by the spring actuated yoke 79 and held in said position until further adjustment is desired. The rearward pull of the bar 74 produces a partial rotation of the main frame about the axis thereof, which is coincident with that of the ground wheels and this rotatory movement of the main frame elevates the pivotal axis or fulcrum of the secondary or auxiliary frame, thereby lifting the forward portion of the latter and correspondingly elevating the cutter reel and the ledger bar, so that a coarser cut of the grass will result. An intermediate adjustment of the cutting mechanism is shown in Fig. 3, and the adjustment illustrated in Fig. 4 represents the maximum height of the cut without lifting the ground roller 37 off the ground. From an inspection of the illustration of the machine, in its several adjustments represented by Figs. 2, 3 and 4, it will be apparent that any desired adjustment to effect the finest to the coarsest cut may be made with facility and accuracy by the operator first disengaging the pull rod 74 from its locking engagement with the handle and pulling backward on the rod and pushing forward on the handle, then releasing the pull rod and permitting the latter to be snapped back into locking engagement by the spring yoke 79.

The mower, like that of the patent hereinbefore identified, is also adapted to effect a draw cut on terraces or inclined surfaces, such an adjustment of the machine being shown in Fig. 5 in which the handle and the pull rod have been swung bodily over the frame members without affecting the relative position of the latter. This is rendered possible by the pivotal connections between the handle and the main frame and the pull rod and the main frame. In this adjustment of the parts, the pull rod being located on the lower face of the handle must necessarily be depressed to unlock it from the handle preparatory to shifting the main frame.

As hereinbefore explained, the secondary frame is pivoted eccentrically to the main frame and is therefore capable of independent motion in a rotary direction about its pivotal axis on the studs 30. This permits the secondary frame to be independently swung on its pivotal axis to lift the ground roller 37 off the ground and additionally elevate the cutter reel and ledger bar from the full line position shown in Fig. 4 to the dotted line position therein. This additional elevation of the cutting mechanism over that permitted by the shifting of the adjusting rod 74 as hereinbefore explained, may be utilized for the cutting of extremely high stubble or weeds, such, for example, as dandelions, which are difficult to cut within the usual range of adjustment of the cutting mechanism. The secondary frame may be thus raised and supported in its raised position by any suitable means. A simple and conveniently operated means comprises a hook or bail member 85 pivotally connected at one end to one of the secondary frame members at 86, and at its upper or hook end being adapted to engage with the tie-rod 11, as shown by dotted lines in said Fig. 4; such adjustment of the secondary frame being conveniently accomplished by the operator engaging the upper end of the hook or bail member by the finger piece 87 projecting laterally from one side thereof and dropping the hook over the tie-rod.

Such raised adjustment of the rear end of the secondary frame, whereby the supported cutting mechanism is suspended a substantial distance above the ground, is also of advantage when it is desired to move the machine from place to place or to store the machine when it is not being operated. It will be noted that in this raised adjustment of the device, substantially all of the mechanism except the handle 16 and the pull rod 74 is confined within the space defined by the peripheries of the ground wheels, so that the mechanism is effectively protected from damage by contact with extraneous objects.

In order to prevent the handle dropping to the ground when released by the operator, there is pivotally secured to the body of the handle, where the latter joins the bails 15, a pendent arm or bracket 90, the lower end of which strikes the ground first and holds the handle in elevated position.

From the foregoing description of the construction and operation of the mower, it will be seen that the operator may quickly and accurately adjust the cutting mechanism to any desired height above the surface to be cut with or without stopping the operation of the machine, so that a uniform cut may be effected at all times whether the machine is operating normally as a front-cut mower or being pulled as a draw-cut mower.

It will also be apparent that any other appropriate form of locking or latching mechanism between the pull rod and the handle may be employed. One modification of the locking means is illustrated in Figs. 13 and 14 in which the pull rod 74' is provided with a series of perforations 95 which are selectively engaged by a pin 96, which passes through aligning perforations in the upstanding ears or lugs of a bracket 97 secured to the upper face of the handle 16.

What I claim is:

1. A lawn mower comprising a main frame including two side members, and a tie bar connecting them, ground wheels journaled thereon, a secondary frame including two connected side members adjacent the side members of the main frame and fulcrumed on the latter eccentrically of the ground wheel journals and between the ground wheels, a cutter reel journaled in the secondary frame, gearing connecting the ground wheels and the cutter reel, a handle pivoted to the main frame, a rod pivotally connected to the tie bar of the main frame and extending longitudinally of the handle to effect a pivotal movement of the main frame and thereby shift the vertical position of the cutter reel, and means for locking the rod in its various positions of adjustment to the handle.

2. A lawn mower comprising a main frame including two plate-like side members and a tie rod connecting the same, ground wheels journaled in the side members each having an internal gear rim, a duplex pinion journaled in each of said side members eccentrically of the ground wheel journals and meshing with the internal gear rim on the corresponding ground wheel, a secondary frame including two side members adjacent the side members of the main frame and fulcrumed on the journals of the duplex gears, a tie-rod connecting the side members of the secondary frame, a rotary cutter reel journaled in said secondary frame, gears on the ends of the cutter shaft meshing with the duplex gears carried by the main frame, a ground roller supported on said secondary frame, a stationary knife bar mounted between the secondary frame members, a handle pivoted to the side members of the main frame, a rod pivoted to the tie rod of the main frame and extending longitudinally of the handle to effect a pivotal movement of the main frame and thereby shift the vertical position of the cutter, and means for locking the rod in its various positions of adjustment to the handle.

3. A lawn mower comprising a main frame including two side members and a tie bar connecting them, a cutter carrying frame pivoted eccentrically thereon, a handle pivotally connected to the side members of the main frame, a rod pivotally connected to the tie bar and extending longitudinally of the handle to effect a pivotal movement of the main frame and thereby shift the vertical position of the cutter, and means for locking the rod in its various positions of adjustment to the handle comprising teeth or serrations on the adjacent faces of the rod and handle for interlocking engagement.

4. A lawn mower comprising a main frame including two side members and a tie bar connecting them, a cutter carrying frame pivoted eccentrically thereon, a handle pivotally connected to the side members of the main frame, a rod pivotally connected to the tie bar and extending longitudinally of the handle to effect a pivotal movement of the main frame and thereby shift the vertical position of the cutter, and means for locking the rod in its various positions of adjustment to the handle comprising teeth or serrations on the adjacent faces of the rod and handle for interlocking engagement and a spring-actuated device for normally holding the toothed or serrated faces of said parts in interlocking engagement.

In testimony whereof I affix my signature.

JASPER VANNETTE.